(12) United States Patent
O Loughlin et al.

(10) Patent No.: US 6,191,385 B1
(45) Date of Patent: Feb. 20, 2001

(54) SMART CONTROLLER FOR LASER PEENING

(75) Inventors: Mark E. O Loughlin, Galloway; Jeff L. Dulaney, Dublin, both of OH (US)

(73) Assignee: LSP Technologies, Inc., Dublin, OH (US)

(\*) Notice: Under 35 U.S.C. 154(b), the term of this patent shall be extended for 0 days.

(21) Appl. No.: 09/349,431

(22) Filed: Jul. 7, 1999

(51) Int. Cl.[7] .................................................. B23K 26/02
(52) U.S. Cl. ............................... 219/121.83; 219/121.84; 219/121.6
(58) Field of Search .................... 219/121.83, 121.84, 219/121.6; 427/457, 554

(56) References Cited

U.S. PATENT DOCUMENTS

| | | | |
|---|---|---|---|
| 4,401,477 | * | 8/1983 | Clauer et al. ............................ 148/4 |
| 5,127,019 | * | 6/1992 | Epstein et al. ......................... 372/108 |
| 5,571,575 | * | 11/1996 | Takayanagi .............................. 427/9 |
| 5,741,559 | * | 4/1998 | Dulaney ................................ 427/554 |
| 5,846,057 | * | 12/1998 | Ferrigno et al. .................. 416/241 R |
| 6,057,003 | * | 5/2000 | Dulaney et al. ..................... 427/457 |

\* cited by examiner

Primary Examiner—Patrick Ryan
Assistant Examiner—M. Alexandra Elve
(74) Attorney, Agent, or Firm—Randall J. Knuth (57) ABSTRACT

A laser shock processing apparatus with controller for controlling laser shock processing operation. The controller generates an operator perceivable alert when a processing value is not within a predetermined range of a preset value. The controller may adjust the processing value to be within the predetermined range or may deactivate a laser from directing a beam of coherent energy to a workpiece. In one embodiment, a plurality of controllers comprise distributed processing of various processing values for controlling laser shock processing operation.

54 Claims, 5 Drawing Sheets

Unsliced Temporal Profile

Fig. 5A

Leading End Sliced Temporal Profile

Fig. 5B

Leading and Trailing End Sliced Temporal Profile

Fig. 5C

SMART CONTROLLER FOR LASER PEENING

BACKGROUND OF THE INVENTION

1. Field of the Invention

The present invention relates to a controller for a laser shock processing apparatus, and in particular, a laser shock processing controller which receives data from a plurality of monitors, processes the received data and provides the appropriate output for controlling a laser shock processing operation.

2. Description of the Related Art

Laser shock processing involves directing a pulse of coherent energy to a piece of solid material to produce shock waves therein. The produced shock waves causes compressive residual stresses to form within the solid material. These compressive residual stresses improve the fatigue hardness and corrosion resistance properties of the solid material.

Numerous parameters must be set to achieve effective laser shock processing. Each parameter comprises a processing value. In order to maximize the effectiveness of laser shock processing, the processing value must be within a predetermined range of an ideal preset value.

Current laser shock processing apparatuses may have a monitor for measuring some processing values. These processing values may then be recorded and/or displayed for a user to observe. The operator, consequently, modifies the laser shock processing apparatus as necessary to adjust the processing value so that the processing value becomes within a predetermined range of an ideal value. In conventional apparatus, adjustments to the laser shock processing apparatus are done manually. An operator observes various processing values and adjusts that apparatus accordingly.

While some processing values are measured or detected by a monitor, other processing values are visually detected by the operator of the laser shock processing apparatus. The operator makes a visual inspection of the laser shock processing apparatus. From this inspection, the operator makes a decision whether various processing values need to be adjusted. If an adjustment needs to be made, the operator will make the necessary adjustments manually.

One disadvantage with current laser shock processing apparatus is that an operator must manually observe numerous processing values and make a personal decision how to proceed. In addition, an operator must use his or her own expertise in laser shock processing to adjust the apparatus according to the measured processing values. Consequently, the operator has to be aware of a multitude of processing values in order to properly adjust the laser shock processing apparatus to achieve effective laser shock processing. The necessity to personally process the various measured values and the subsequent adjustment of the laser shock processing apparatus is both tedious and time-consuming.

A second disadvantage in the art of laser shock processing apparatuses is that numerous processing values are not machine-monitored at all. An operator must personally inspect various non-monitored processing values to ensure the processing value is within an acceptable range of an ideal processing value. Furthermore, if an operator determines that the processing value is not within an acceptable range of an ideal value, the operator manually adjusts the processing value until the processing value is within an acceptable range of an ideal value.

A third disadvantage in the art of current laser shock processing apparatuses is that an operator has to make a personal decision whether to proceed with laser shock processing. Currently, an operator observes the measured (i.e. monitored) processing values and makes his or her own inspection to observe the non-measured (i.e. non-monitored) processing values. Then, the operator makes a decision whether to adjust the various processing values and whether to proceed with laser shock processing of a workpiece.

What is needed in the art of laser shock processing is a controller which receives data from various processing value monitors, processes the data to generate an output for controlling laser shock processing functions such as adjusting the respective processing value and, if necessary, deactivating the laser from directing a pulse of coherent energy to a workpiece.

SUMMARY OF THE INVENTION

The present invention provides an apparatus for laser shock processing using a controller which receives input from a monitor. The controller processes the input data and generates an output for controlling various laser shock processing functions. In one embodiment, the controller alerts an operator that a processing value is not within a predetermined range of a processing value. In an alternate embodiment, the controller adjusts the processing value for bringing the processing value within the predetermined range of a preset value. In another embodiment, the controller deactivates the laser, whereby preventing the laser from directing a beam of coherent energy.

The present invention, in one embodiment thereof, is an apparatus for laser shock processing in which a pulse of coherent energy is directed to a workpiece to create a shock wave therein. The pulse of coherent energy has physical characteristics, which includes an energy, a temporal profile, and a spatial profile. The apparatus includes a transparent overlay material applied to the workpiece. There is at least one processing value. A laser is operatively associated with the transparent overlay material and the laser is operable to direct the beam of coherent energy. There is at least one monitor. Each of the monitors generates a respective monitor signal. There is a respective preset value corresponding to each monitor signal. A monitor controller is operatively associated with at least one monitor signal and the laser. The monitor controller compares the monitor signal to a respective preset value. The monitor controller generates a control signal if the monitor signal is not within a predetermined range of the respective preset value. In one embodiment, the control signal is operator perceivable. In an alternate embodiment, the control signal is operatively associated with the laser for deactivating the laser from directing the beam of coherent energy. In yet another alternate embodiment, the control signal is operatively associated with at least one processing value for adjusting that processing value. In a further embodiment thereof, the processing value is adjusted to make the respective monitor signal within a predetermined range of the respective preset value.

In various alternate embodiments, the processing value includes the energy, a temporal profile, and a spatial profile of a pulse of coherent energy. Additionally, the processing value may include the current supplied to a flashlamp, the presence or absence of sufficient energy absorbing material and transparent overlay material. In various alternate embodiments, the at least one monitor includes an energy monitor, a temporal profile monitor, a spatial profile monitor, a pulse-width monitor, a plasma monitor, an acoustic monitor, a flashlamp monitor, an overlay monitor, and a target backscatter monitor.

In one further embodiment, there is at least two monitors and at least two monitor controllers. Each monitor is operatively associated with one monitor controller. A laser controller is operatively associated with each control signal generated from each monitor controller. The laser controller compares each respective control signal to at least one predetermined operating condition. The laser controller generates a laser control signal if the control signals are not within a predetermined range of the operating condition. In one alternate further embodiment, the laser control signal is operator perceivable. In an alternate further embodiment, the laser control signal is operatively associated with the laser for deactivating the laser from directing the beam of coherent energy.

The present invention, in yet another form thereof is an apparatus for laser shock processing in which a pulse of coherent energy is directed to a workpiece to create a shockwave therein. The apparatus includes a transparent overlay material applied to the workpiece. There are at least two processing values and a laser is operatively associated with the transparent overlay material. The laser operates to direct the beam of coherent energy. There are at least two monitors, each monitor operatively associated with each processing value, respectively. Each of the two monitors generates a respective monitor signal. A respective preset value corresponds to each of the monitor signals. There are at least two monitor controllers. Each monitor controller is operatively associated with each of the monitor signals, respectively. Each monitor controller compares the monitor signal to a respective preset value. The monitor controller generates a control signal if the monitor signal is not within a predetermined range of the respective preset value. A laser controller is operatively associated with each of the control signals. The laser control compares each respective control signal to at least one predetermined operating condition. The laser controller generates a laser control signal if the control signals are not within a predetermined range of the operating condition. In one further embodiment, the laser control signal is operator perceivable. In an alternate embodiment, the laser control signal is operatively associated with the laser for deactivating the laser from directing the beam of coherent energy.

One advantage of the present invention is a controller which processes and produces output for controlling laser shock processing functions. The controller makes a determination whether the monitored processing value is within an acceptable range of an ideal, preset value. In various embodiments of the present invention, the controller makes a determination whether to proceed with laser shock processing. Alternatively, the controller can deactivate the laser from directing a beam of coherent energy to the workpiece. Consequently, control of the laser shock processing apparatus is controller-driver rather than operator-driven.

A second advantage of the present invention, in various embodiments thereof, is the inclusion of monitors which measure processing values, respectively. Prior to this invention, numerous processing values were either observed only through operator observation or not observed at all. With this invention, the laser shock processing apparatus includes monitors for measuring and monitoring necessary processing values. A respective controller receives the processing values. In one particular embodiment, the controller adjusts the processing value to make the processing value within a predetermined range of a preset value.

Yet another advantage of the present invention is the automated control for adjusting processing values. In a particular embodiment of the present invention, the controller adjusts the processing value as necessary. Consequently, an operator does not have to manually adjust the processing value.

An additional advantage of the present invention is the use of distributed processing for controlling the operation and function of a laser shock processing apparatus. In one particular embodiment, at least two monitors monitor two processing values. The laser controller receives control signals from the various monitor controllers. The laser controller processes the entire set of received control signals. The laser controller compares the control signals either individually or together as a set of control signals set to a predetermined operating condition. When the control signals, either individually or together as a set, are not within a predetermined range of an operating condition, the laser controller generates a control signal. Consequently, the function of monitoring and control of individual processing values are distributed to respective monitors and monitor controllers. The laser controller acts as a central processor for interpreting the control signals from the individual, distributed monitor controllers.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

The improvements in fatigue life produced by laser shock processing are the result of deep residual compressive stresses developed in the irradiated surface that retard fatigue crack initiation, and/or slow crack propagation. The shape of the crack front or slowing of the crack growth rate occurs when the crack encounters the laser shocked zone. Laser shock processing is an effective method for increasing fatigue life in metals by treating fatigue critical regions. For a more thorough background of the prior history of laser shock processing and high powered laser processing of engineered material, reference can be made to the U.S. Pat. No. 5,131,957.

In laser shock processing, numerous processing values are monitored and adjusted. Such processing values include the energy, a temporal profile and a spatial profile of a beam of coherent energy, a target backscattering event. In addition, processing values may be the presence or absence of proper overlay material. Further, processing values may relate to various laser shock processing systems such as the flashlamps, an overlay application system, a plasma monitor and an acoustic monitor. In addition, the processing values may relate to the laser beam integrity and the environment about the laser processing apparatus and the workpiece to be processed.

Figure 1:
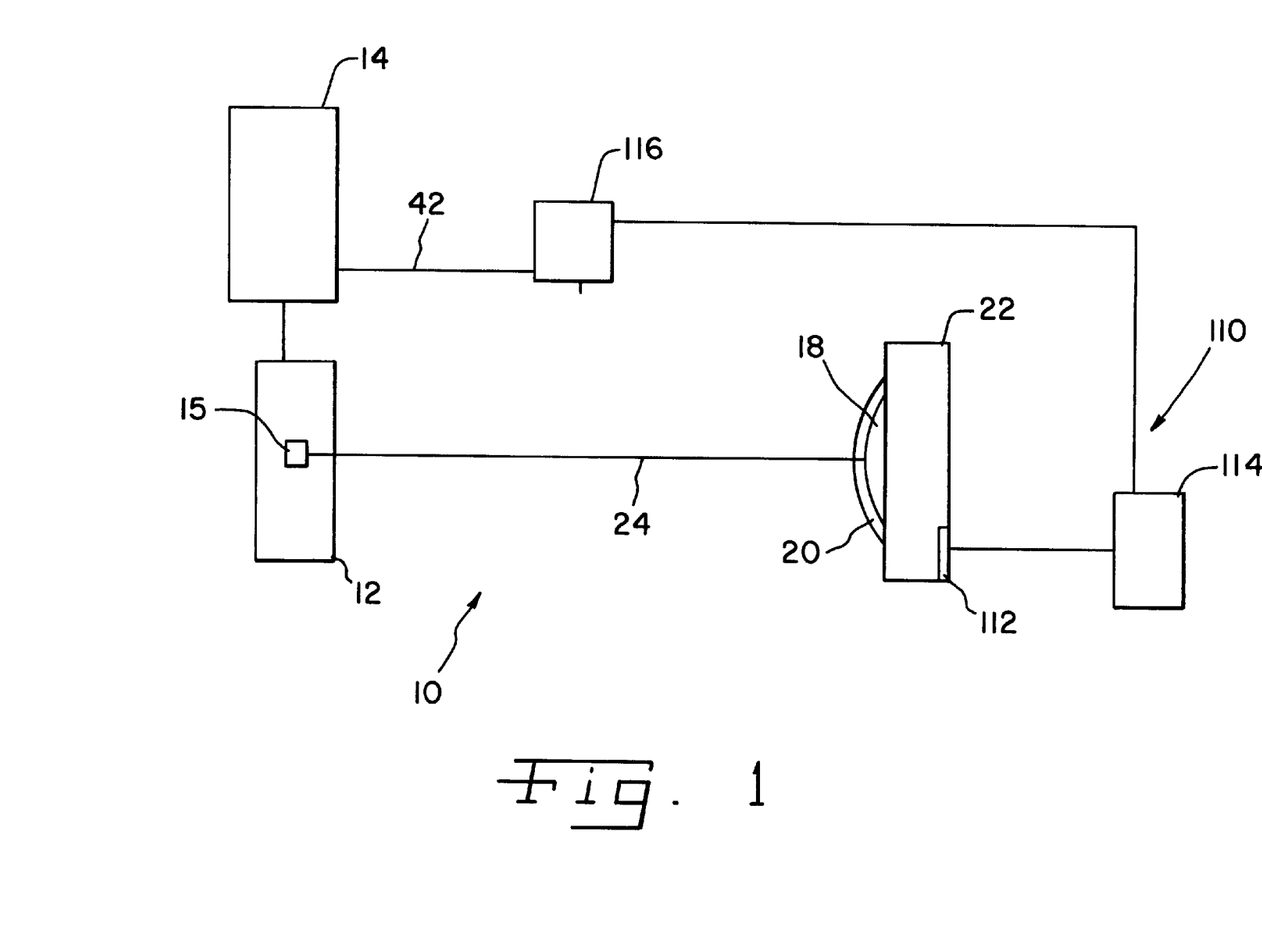
FIG. 1 is a diagrammatic view of a laser shock processing apparatus according to the present invention.

Referring now to FIG. 1, there is shown laser shock processing apparatus 10 which encompasses the present invention. Laser shock processing apparatus 10 includes laser 12 and a plurality of processing value controller systems 14. Laser 12 contains an amplifier with gain medium pumped with flashlamps 15. Each controller system 14 generates a control signal 42. Opaque overlay 18 and transparent overlay 20 are applied to workpiece 22 during or prior to laser shock processing. A beam of coherent energy 24 is directed from laser 12 to the energy absorbing material 18. Energy absorbing material 18 is partially vaporized forming a plasma therein, and producing a shock wave on workpiece 22 which imparts deep compressive residual stresses in workpiece 22.

Part tracking system 110 comprises workpiece tag 112 and workpiece tag reader 114. Workpiece tag 112 is affixed to workpiece 22. Workpiece tag reader 114 is operatively associated with workpiece tag 112 whereby laser shock processing apparatus 10 identifies workpiece 22 by its workpiece tag 112. Data recorder 116 compiles a database coordinating workpiece tag 112 to the workpiece 22 to be processed. Workpiece tag 112 could be a part serial number which is read and understood by workpiece tag reader 114. Further, the part serial number could be previously assigned and affixed to workpiece 22 by the manufacturer of workpiece 22.

Data recorder 116 records relevant information pertaining to laser shock processing, such as data pertaining to the processing of individual workpieces. Data pertaining to each workpiece 22 is correlated to a specific workpiece through workpiece tag 112. The various control signals 42 are recorded for each workpiece processed and correlated to a respective workpiece tag 112. Consequently, a database of each processed workpiece 22 with corresponding control signals 42 are compiled.

Quality control may be done by analyzing the recorded data and properly identifying a specific workpiece from workpiece tag 112. For example, if analysis of the data suggests that a specific workpiece was not effectively laser shock processed, the specific workpiece at issue is correctly identified from workpiece tag 112.

Figure 2:
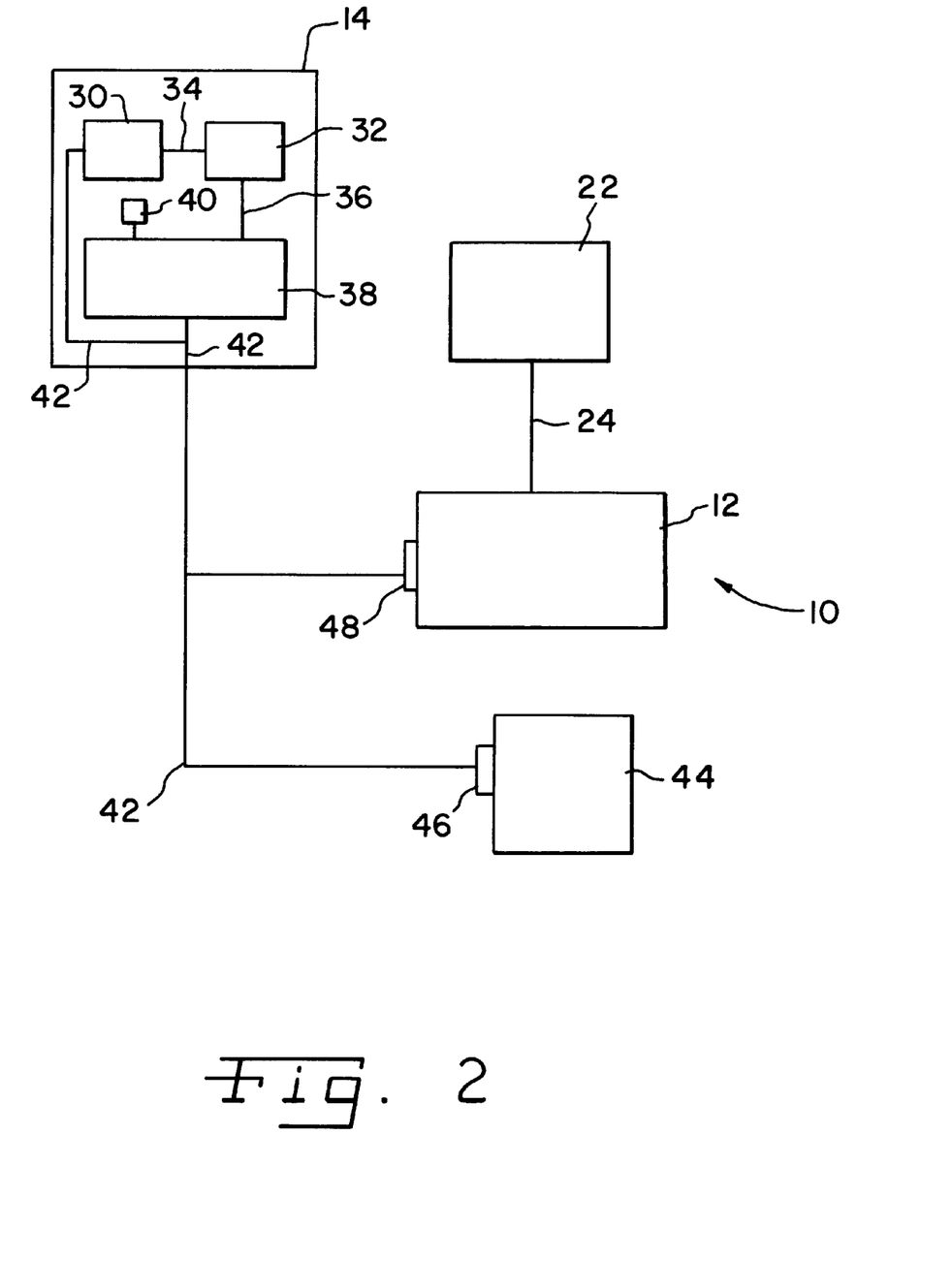
FIG. 2 is a diagrammatic view of one of a plurality of processing value control systems according to the present invention.

In one embodiment, the laser shock processing apparatus comprises a plurality of processing value controller systems 14. For simplification, FIG. 2 is illustrative of just one of the plurality of controller systems 14. Referring specifically to FIG. 2, each of the controller systems 14 is associated with a processing value 30. Monitor 32 is operatively associated with processing value 30 by processing value signal 34. Monitor 32 generates a monitor signal 36. Monitor signal 36 corresponds to processing value 30. However, monitor signal 36 is not necessarily equivalent to a measurable quantity. Rather, monitor signal 36 may be produced through mathematical manipulation of processing value signal 34. Alternatively, rather than quantitative data, monitor signal 36 can be a boolean expression (e.g. 1 or 0) generated by monitor 32 based upon the data represented within processing value signal 34.

Monitor controller 38 is operatively associated with monitor signal 36 and preset value 40. Monitor controller 38 compares monitor signal 36 to a preset value 40. Preset value 40 is a predetermined value corresponding to a theoretically and/or empirically derived value. Monitor controller 38 generates control signal 42 if monitor control signal 36 is not within a predetermined range of the preset value.

The predetermined range of the preset value is a theoretically and/or empirically derived range in which laser shock processing apparatus 10 functions effectively. The predetermined range of the preset value varies depending on the respective processing value. For example, if the processing value is the energy of the beam of coherent energy, the preset value may correspond to an energy of 50 joules and the predetermined range may correspond to +/−5 joules. In this example, the monitor controller will generate a control signal if the monitor signal corresponds to an energy less than 45 joules or greater than 55 joules.

Alternatively, if the processing value is the presence of a sufficient transparent overlay, monitor signal 36 will correspond to a boolean value. The preset value is 1 and the predetermined range would be 0. Therefore, monitor controller 38 will return a control signal 42 when monitor signal 36 is 0, which corresponds to the absence of sufficient transparent overlay.

Output device 44 includes bus 46 which receives control signals 42 from the plurality of controller systems 14. Output device 44 can be either a visual screen or a speaker which produces an audible alert. Output device 44 is operator perceivable such that an operator of laser shock processing apparatus 10 can see and/or hear when monitor controller 38 detects that processing value 30 is outside of normal operating conditions.

Processing value 30 is operatively associated with control signal 42. Monitor controller 38 adjusts processing value 30 so that processing value 30 is within an acceptable range. The adjustment of the processing value 30 to an acceptable range occurs by adjusting processing value 30 until the corresponding monitor signal 36 is within a predetermined range of the respective preset value.

Laser 12 is also operatively associated with monitor controller 38 by a control signal 42. Laser 12 contains bus 48 which receives the control signals 42 from the plurality of controller systems 14. Monitor controller 38 can deactivate laser 12 from directing a beam of coherent energy to workpiece 22 if monitor signal 36 is not within a predetermined range of the respective preset value.

Figure 3:
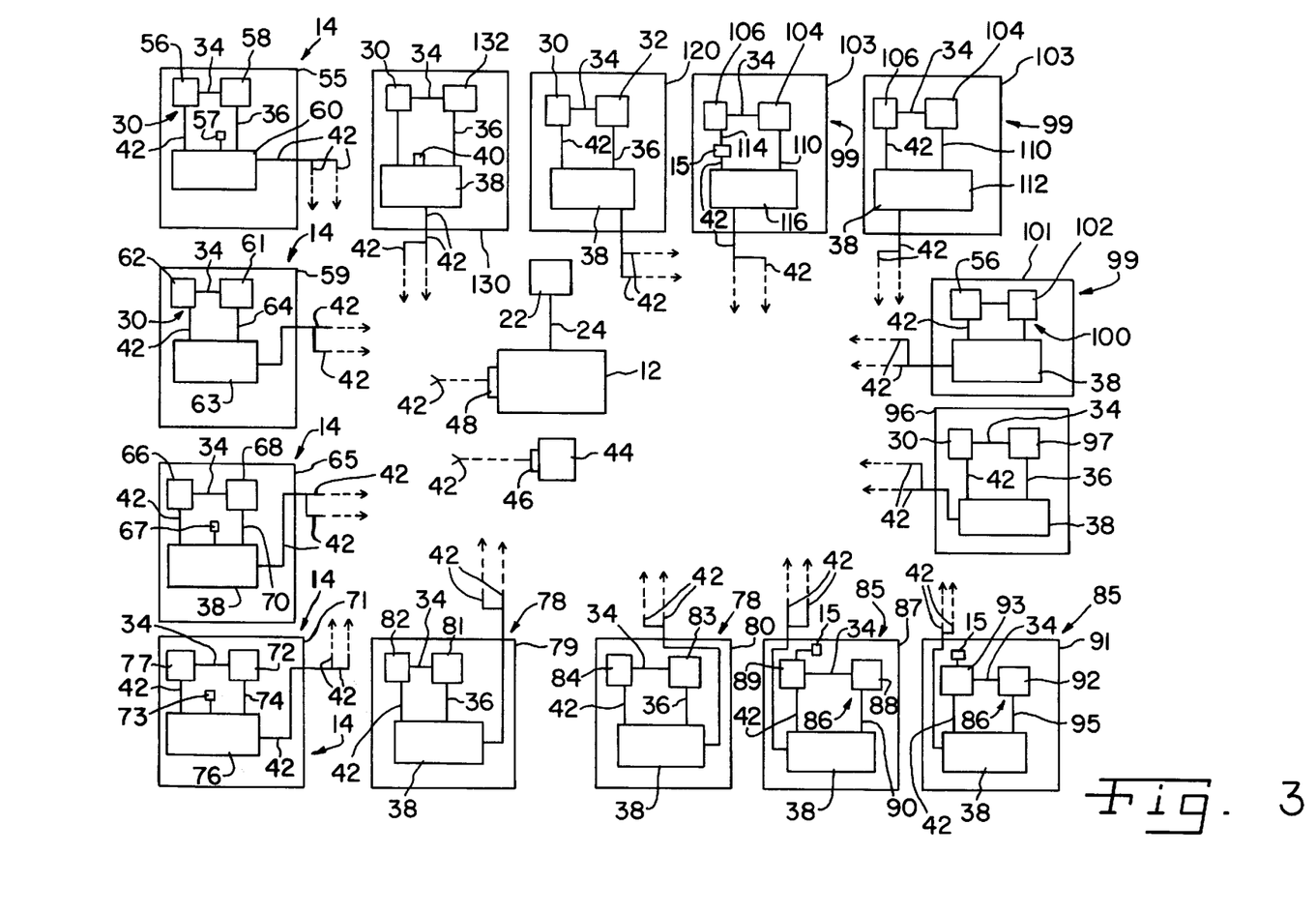
FIG. 3 is a diagrammatic view of a plurality of processing value control systems according to the present invention.

Referring to the embodiment of FIG. 2 along with FIG. 3, in one further embodiment (and depicted counter-clockwise from the upper left hand corner of FIG. 3), the plurality of controller systems 14 comprises energy system 55, temporal system 59, spatial system 65, pulse-width system 71, and process system 79. Process systems 78 further comprises plasma system 81 and acoustic system 83. The plurality of controller systems 14 further includes a flashlamp system 85 which comprises current system 87 and fluorescence system 91. Further, controller systems 14 includes overlay system 96 and laser beam integrity systems 99 comprising optic system 101, internal laser energy system 103, and backscatter system 120. Controller system 14 may comprise environmental system 130. In addition to the various depicted controller systems 14 of FIG. 3, the plurality of controller systems may also include an amplified spontaneous emission system, a video imaging system, and a pulse-forming system (not shown). Each controller system 14 generates a control signal 42 operatively associated with output device 44 and laser 12 through bus 46, 48 respectively.

Energy system 55 monitors and controls processing value, energy signal 56. Energy monitor 58 is operatively associated with energy signal 56 of laser beam 24 and an energy preset value 57. Energy controller 60 adjusts energy signal 56 to make energy signal 56 to be within a predetermined range of the energy preset value 57.

The preferred preset value for the energy varies with the type of laser shock processing system which incorporates an energy monitor 58. For some laser systems, the energy preset value may be fixed at between 45 and 50 joules. For other systems, the energy preset value may be 10 joules. The preferred predetermined range of the energy preset value should be within 10% and preferably within 5% of the energy preset value.

Temporal system 59 includes temporal monitor 61, which is operatively associated with temporal profile 62 of the laser pulse. Temporal controller 63 adjusts temporal profile 62 to make temporal monitor signal 64 lie within the predetermined range of a temporal preset value.

The typical temporal preset value is 100 ns or less. In some laser systems a temporal preset value of 20 ns is used, and in others a 5–10 ns pulse can be advantageous. The predetermined range of a temporal preset value is controlled to be within about 20%, and preferably 5% or less of the temporal preset value.

Figure 5A:
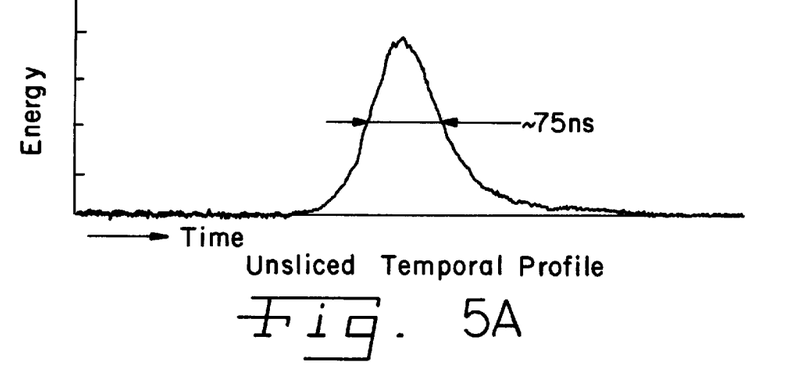
FIGS. 5a through 5c depict the temporal profile of a pulse of coherent energy.
Figure 5B:
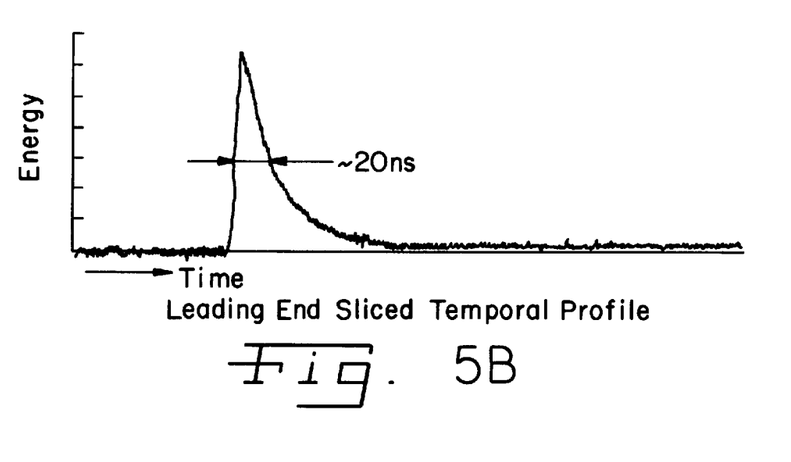
Figure 5C:
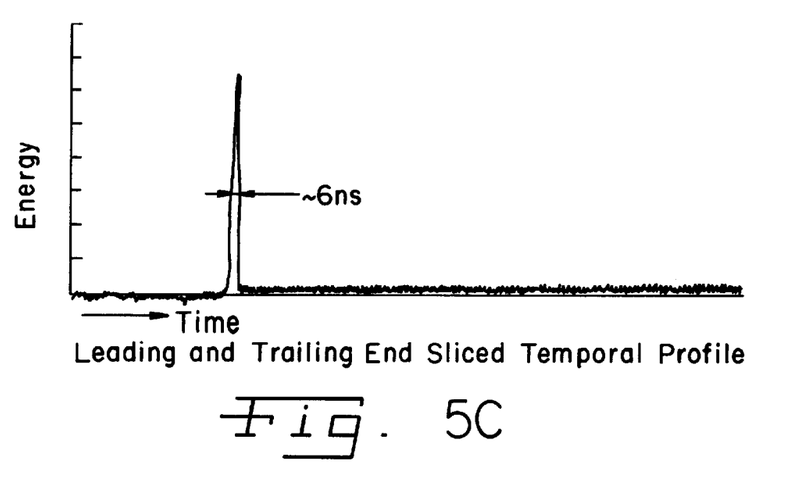

Referring now to FIGS. 5a through 5c, there is shown the temporal profile of three different pulses of coherent energy. FIG. 5a depicts the temporal profile of a pulse of coherent energy which has not been altered. FIG. 5b depicts the temporal profile of a pulse of coherent energy having the leading edge of the temporal profile sliced off, and FIG. 5a depicts the temporal profile of both the leading and trailing ends removed.

In this example, the pulse width of the unsliced temporal profile is approximately 75 ns (FIG. 5a). The temporal width of the pulse of coherent energy having its leading end sliced off is approximately 20 ns (FIG. 5b). The result of removing both the leading and trailing ends of a pulse of coherent energy results in a temporal profile pulse width of about 6 ns, as depicted in FIG. 5c. Note that the pulse width can be adjusted to the desired pulse width by adjusting the timing for slicing the leading and/or trailing edge(s) of the pulse.

Referring back to FIG. 3, spatial system 65 controls and monitors a processing value corresponding to the spatial profile 66 of laser beam 24. The spatial profile 66 is adjusted to make the spatial profile 66 lie within a predetermined range of a spatial preset value 67. Spatial monitor 68 is operatively associated with spatial profile 66 and generates a spatial monitor signal 70 which corresponds with spatial profile 66 of the laser pulse.

It is believed that a uniform energy distribution is preferable in laser shock processing, while minimizing damage to the laser system itself. However, it may be advantageous to have a spatial energy profile with a beam peak (i.e. an area of increased amplitude of energy). The beam shape (i.e. round, square, annular, triangular, etc.) is a factor which affects whether it is advantageous to have a beam peak.

The spatial preset value can be a parameter of peak-to-average energy across the spatial profile. It is preferable to keep the peak-to-average to less than 20% and optimally, less than 5% of the spatial preset value.

In a further embodiment, the temporal system may comprise pulse-width system 71 having pulse-width monitor 72. Pulse-width monitor 72 generates a pulse-width signal 74. Pulse-width preset value 73 is operatively associated with controller 76. Pulse-width controller 76 adjusts the pulse-width 77 of this laser to make the pulse-width 77 within a predetermined range of a pulse-width preset value. Pulse-width 77 is adjusted by slicing off (i.e. removing) the trailing width and/or the leading edge of a beam of coherent energy.

Process systems 78 monitors and controls the effect of laser shock processing of workpiece 22. Process system 78 may further comprise a plasma system 79 and an acoustic system 80. Plasma monitor 81 monitors the processing value 82 corresponding to the plasma formed on workpiece 22. Acoustic monitor 83 detects acoustic energy 84 generated during laser shock processing when a beam of coherent energy is directed to workpiece 22.

Plasma monitor 81 may monitor the temperature of the plasma formed on workpiece 22 and/or monitor an optical signal emitted from the plasma on workpiece 22 when a beam of coherent energy is directed to workpiece 22. When plasma monitor 81 is measuring a plasma temperature, the predetermined range of a preset temperature value is about 10% of the desired temperature and preferably within 5%. When plasma monitor 81 measures the peak of an optical signal, it is preferable to have a predetermined range of 10% and an ideal range of 5% of the ideal peak optical preset value.

It is recommended that the predetermined range of a preset acoustic value be within 10% of the ideal preset value and preferably within 5% of that ideal acoustic value.

Flashlamp systems 85 includes a flashlamp monitor 86. Flashlamp system 85 may include a current system 87 with the flashlamp monitor 86 being current transducer 88. Current transducer 88 generates a current signal 90 based on current 89 drawn by the flashlamps 15. Current 89 supplied to the flashlamps 15 is adjusted to make the current signal 90 to be within a predetermined range of a current preset value.

Alternatively, rather than using current system 87 for detecting and adjusting current supplied to the flashlamps 15, flashlamp system 85 could detect and adjust voltage supplied to the flashlamps 15.

Flashlamp monitor 86 detects whether a flashlamp flashes. The preset value would be a 1 or 0 corresponding to flashing or not flashing, respectively. A predetermined range may be three consecutive non-flashes. Flashlamp monitor 86 may deactivate laser 12 from directing a beam of coherent energy to workpiece 22 when flashlamp monitor 86 determines that the flashlamp has not flashed for a preset number of flashes.

Flashlamp monitor 86 may also include fluorescence monitor 92. Fluorescence monitor 92 detects fluorescence 93, which is a processing value that is produced by a flashlamp 15. Fluorescence 93 is adjusted to make fluorescence signal 95 within a predetermined range of a fluorescence preset value. In one embodiment the fluorescence signal 95 is adjustable by adjusting either the current or voltage supplied to the flashlamps 15.

There is no preferred fluorescence processing value for all laser systems as the detected fluorescence signal is dependent upon the detector type and the detector location from the fluorescence source. Once the preferred fluorescence value is determined as a function of laser system characteristics and the detector geometry, the fluorescence range should be within 5% and preferably within 2% of the preferred value.

Overlay system 96 monitors and controls the detection and application of overlay material to the workpiece. Overlay monitor 97 detects the absence or presence of sufficient overlay material, opaque energy absorbing material 18 or transparent overlay 20.

Laser beam integrity systems 99 monitors and controls the integrity of the laser beam 24. Laser beam integrity monitor 100 monitors the integrity of laser beam 24. Laser beam integrity monitor 100 may comprise an optic damage monitor 102, an internal laser energy monitor 104 or a target backscatter monitor 120. An Optic damage monitor 102 may also be included to monitor the optics such as lenses (not shown).

Internal laser energy monitor 104 monitors energy present within the laser 12, laser energy 106, possibly at the input to each laser amplifier (not shown).

In one embodiment, the flashlamp discharge timing (i.e. time between flashlamp flashes) is adjusted in order to make laser energy 106 within a predetermined range of a preset laser energy value 108. Decreasing the flashlamp discharge timing will increase laser energy 106.

Internal laser energy monitor 104 monitors laser energy 106 and increases or decreases the flashlamp discharge timing as appropriate to make the laser energy within operating parameters. Internal laser energy monitor 104 generates laser energy signal 110 which is communicated to internal laser energy controller 112. Internal laser energy controller 112 generates a control signal 42 which is operatively associated with the flashlamps 15 for increasing or decreasing the flashlamp discharge timing.

Alternatively, laser beam integrity monitor 104 can adjust the laser energy by adjusting either the current or voltage to the flashlamps 15. Flashlamps 15 are operatively associated with laser energy 106 by line 114. Flashlamps 15 pump the gain medium whereby increasing laser energy 106. Laser beam integrity monitor 104 generates a laser energy signal 110 with corresponds to the laser energy 106. Laser beam integrity controller 114 generates a control signal 42 which is operatively associated with flashlamp 15. Control signal 42 adjusts the current or voltage to flashlamp 15 until the laser energy signal 110 is within a predetermined range of a preset laser energy value.

Target backscatter monitor 120 detects the presence of energy reflected back from workpiece 22 after a beam of coherent energy is directed to workpiece 22. Target backscatter monitor 120 detects the absence or presence of laser beam 24 reflecting off of workpiece 22, transparent overlay 20 or anything else in the beam path. The preset value corresponds to a 0 (i.e. the absence of a target backscatter effect). The preferred range is typically two, whereby if the target backscatter monitor 120 detects two consecutive target backscatter events, target backscatter monitor 120 may deactivated laser 12.

Environmental system 130 includes environmental monitor 132. Environmental monitor 132 detects environmental conditions such as humidity, temperature, and particulate matter within the proximity of workpiece 22 or within the laser 12. Environmental monitor 132 may also monitor the temperature of coolant, the flow of coolant and the pressure of coolant used throughout laser 12 laser or laser apparatus 10. Environmental monitor 108 may also monitor the presence or absence of functional air knives (not shown). In addition, environmental monitor 132 may monitor the positioning of workpiece 22.

Laser system 10 may employ other controller systems not depicted in FIG. 3 having various monitors 32. For example, other controller systems include a video image system for observing various components of laser shock processing apparatus 10. The video image system utilizes video imaging monitors (not shown). These monitors assist in aligning workpiece 22 relative to laser beam 24. In addition, video imaging monitors may be used to observe the presence of opaque overlay 18 and transparent overlay 20. In addition, video imaging monitors may be used to detect that the laser beam 24 is aligned to a proper processing spot on workpiece 22.

A pulse-forming system (not shown) may include a pulse-forming network (PFN) voltage monitor (not shown). The PFN voltage is used to determine the pumping level of the flashlamps (not shown). Controlling the PFN voltage to within a desired range improves the repeatability of the laser energy. It is preferable to control the voltage to be within 10% and preferably within 5% of an ideal PFN voltage.

Monitor 32 may comprise an amplified spontaneous emission (ASE) monitor (not shown). The ASE monitor detects the absence or presence of amplified spontaneous emission as a 0 or 1 signal. If the ASE monitor detects several repeated amplified spontaneous emission events, the ASE monitor can deactivate laser 12 from directing a beam of coherent energy to workpiece 22.

Figure 4:
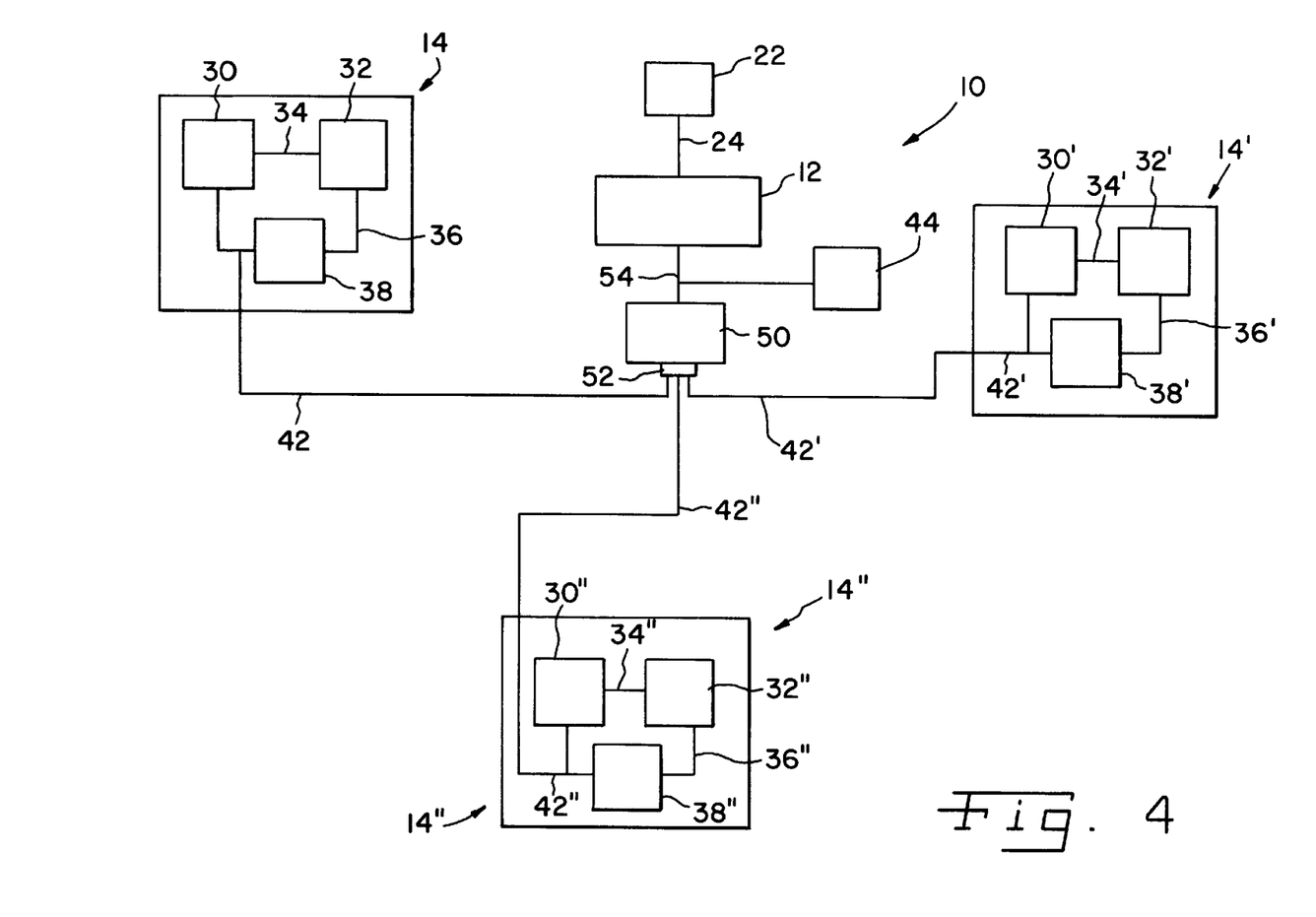
FIG. 4 is a diagrammatic view depicting distributed controller processing of a laser shock processing apparatus according to the present invention.

Referring to FIG. 4, in an additional embodiment, laser shock processing apparatus 10 incorporates distributed processing control among the plurality of processing value controller systems 14. For simplicity, FIG. 4 is illustrative of distributed processing among three controller systems 14, 14', 14". Each of the plurality of processing value controller systems 14, 14', 14" generate control signal 42, 42', 42" respectively when the monitor signal 36, 36', 36" is not within a predetermined range of the respective preset value.

Laser controller 50 contains bus 52 for receiving the control signals 42, 42', 42". Laser controller 50 compares the respective control signal 42, 42', 42" to at least one predetermined operating condition. A predetermined operating condition could be to comparing each control signal 42, 42', 42" to a predetermined value respectively. Alternatively, a predetermined operating condition may be an amalgamation of all processing values.

Laser control signal 54 is generated by laser controller 50 if the control signals 42, 42', 42" are not within a predetermined range of the operating condition. The predetermined range of the operating condition is based on theoretical and empirical data. When the monitor signals, taken together, are within a predetermined operating condition, effective laser shock processing is realized.

Laser controller 50 is also operatively associated with laser 12. Laser controller 50 may deactivate laser 12 from directing a beam of coherent energy to workpiece 22. In addition, output device 44 alerts an operator that the processing values, individually or together, are outside of the predetermined range of the operating condition.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for laser shock processing in which a pulse of coherent energy is directed to a workpiece to create a shockwave therein, the pulse of coherent energy having physical characteristics including an energy, a temporal profile, and a spatial profile, the apparatus comprising:

a transparent overlay material, said transparent overlay material applied to the workpiece;

at least one processing value;

a laser operatively associated with said energy transparent overlay material, said laser operable to direct the beam of coherent energy;

at least one monitor operatively associated with each said at least one processing value, each said at least one monitor generating a respective monitor signal;

a respective preset value corresponding to each said monitor signal; and a monitor controller operatively associated with at least one monitor signal and said laser, said monitor controller comparing said monitor signal to a respective preset value, said monitor controller generating a control signal if said monitor signal is not within a predetermined range of said respective preset value.

2. The apparatus according to claim 1 wherein said control signal is operator perceivable.

3. The apparatus according to claim 1 wherein said control signal is operatively associated with said laser for deactivating said laser from directing the beam of coherent energy.

4. The apparatus according to claim 1 wherein said control signal is operatively associated with said at least one processing value for adjusting said at least one processing value.

5. The apparatus according to claim 4 wherein said at least one processing value is adjusted to make said respective monitor signal within said predetermined range of said respective preset value.

6. The apparatus according to claim 1 wherein said at least one processing value comprises the energy of the beam of coherent energy, said at least one monitor comprises an energy monitor, said respective monitor signal comprises an energy signal, and said respective preset value comprises an energy preset value.

7. The apparatus according to claim 6 wherein said control signal is operatively associated with the energy for adjusting the energy.

8. The apparatus according to claim 7 wherein said energy is adjusted to make said energy signal within said predetermined range of said energy preset value.

9. The apparatus according to claim 1 wherein said at least one processing value comprises the temporal profile of the beam of coherent energy, said at least one monitor comprises a temporal monitor, said respective monitor signal comprises a temporal monitor signal, and said respective preset value comprises a temporal preset value.

10. The apparatus according to claim 9 wherein control signal is operatively associated with the temporal profile for adjusting the temporal profile.

11. The apparatus according to claim 10 wherein said temporal profile is adjusted to make said temporal monitor signal within said predetermined range of said temporal preset value.

12. The apparatus according to claim 1 wherein said at least one processing value is the spatial profile of the beam of coherent energy, said at least one monitor comprises a spatial monitor, said respective monitor signal comprises a spatial monitor signal, and said respective preset value comprises a spatial preset value.

13. The apparatus according to claim 12 wherein said control signal is operatively associated with the spatial profile for adjusting the spatial profile.

14. The apparatus according to claim 13 wherein the spatial profile is adjusted to make said spatial profile signal within said predetermined range of said spatial preset value.

15. The apparatus of claim 1 further comprising:
said at least one processing value comprises:
the energy,
the temporal profile, and
the spatial profile of the beam of coherent energy;
said at least one monitor comprises:
an energy monitor,
a temporal monitor, and
a spatial monitor; and
said respective preset values comprises:
an energy preset value,
a temporal preset value, and
a spatial preset value.

16. The apparatus according to claim 15 wherein said control signal is operator perceivable.

17. The apparatus according to claim 15 wherein said control signal is operatively associated with said laser for deactivating said laser from directing the beam of coherent energy.

18. The apparatus according to claim 15 wherein said control signal is operatively associated with at least one said processing value for adjusting said respective processing value.

19. The apparatus according to claim 15 wherein each said processing value is adjustable to make each said monitor signal within said predetermined range of each said respective preset value.

20. The apparatus of claim 1 wherein the pulse of coherent energy has a pulse-width, said at least one processing value comprises a pulse-width signal, said at least one monitor is a pulse-width monitor, said respective monitor signal comprises a pulse-width signal, and respective preset value comprises a pulse-width preset value.

21. The apparatus of claim 20 wherein the pulse of coherent energy has a leading edge and a trailing edge; and said control signal is operatively associated with said pulse-width for adjusting said pulse-width by slicing-off said leading edge.

22. The apparatus of claim 21 wherein said trailing edge is sliced-off.

23. The apparatus of claim 1 wherein said at least one monitor comprises a laser beam integrity monitor.

24. The apparatus of claim 1 wherein said at least one monitor comprises a process control monitor.

25. The apparatus of claim 1 wherein said at least one monitor comprises a plasma monitor.

26. The apparatus of claim 1 wherein said at least one control monitor comprises an acoustic monitor.

27. The apparatus of claim 1 further comprising a data recording device.

28. The apparatus of claim 27 wherein said data recording device records said respective monitor signal.

29. The apparatus of claim 28 further comprising workpiece data and said data recording device records said workpiece data.

30. The apparatus of claim 1 wherein said at least one monitor comprises a flashlamp monitor.

31. The apparatus of claim 30 wherein said flashlamp monitor is a current transducer.

32. The apparatus of claim 31 wherein said respective monitor signal is a current signal.

33. The apparatus according to claim 32 wherein said current signal is operatively associated with said current for adjusting said current signal to be within said predetermined range of said respective preset value.

34. The apparatus of claim 30 wherein said flashlamp monitor is a fluorescence monitor.

35. The apparatus of claim 1 wherein said at least one monitor comprises an overlay monitor.

36. The apparatus of claim 35 wherein said overlay monitor detects the absence of sufficient transparent overlay material.

37. The apparatus of claim 1 wherein said apparatus further comprises an energy absorbing material and said at least one monitor detects the absence of sufficient energy absorbing material.

38. The apparatus of claim 23 wherein said laser beam integrity monitor further comprises an optic damage monitor.

39. The apparatus of claim 23 wherein said laser beam integrity monitor further comprises an internal laser energy monitor.

40. The apparatus of claim 23 wherein said laser beam integrity monitor further comprises a target backscatter monitor.

41. The apparatus of claim 1 wherein said at least one monitor comprises an environmental monitor.

42. The apparatus of claim 1 further comprising a part tracking system.

43. The apparatus of claim 42 wherein said part tracking system further comprises:
   a workpiece tag affixed to the workpiece; and
   a workpiece tag reader.

44. The apparatus of claim 1 further comprising:
   said at least one monitor comprises at least two monitors;
   at least a second said monitor controller, each said monitor operatively associated with one said monitor controller; and
   a laser controller operatively associated with each said control signal, said laser controller comparing each respective said control signal to at least one predetermined operating condition, said laser controller generating a laser control signal if said control signals are not within a predetermined range of said operating condition.

45. The apparatus of claim 44 wherein said laser control signal is operator perceivable.

46. The apparatus according to claim 44 wherein said laser control signal is operatively associated with said laser for deactivating said laser from directing the beam of coherent energy.

47. An apparatus for laser shock processing in which a pulse of coherent energy is directed to a workpiece to create a shockwave therein, the apparatus comprising:
   a transparent overlay, said transparent overlay applied to the workpiece;
   at least two processing values;
   a laser operatively associated with said transparent overlay, said laser operable to direct the beam of coherent energy;
   at least two monitors, each said monitor operatively associated with one of each said processing values, respectively, each said at least two monitors generating a respective monitor signal;
   a respective preset value corresponding to each said monitor signal;
   at least two monitor controllers, each said monitor operatively associated with each said monitor signal, said monitor controller comparing said monitor signal to a respective preset value, said monitor controller generating a control signal if said monitor signal is not within a predetermined range of said respective preset value; and
   a laser controller operatively associated with each said control signal, said laser controller comparing each respective said control signal to at least one predetermined operating condition, said laser controller generating a laser control signal if said control signals are not within a predetermined range of said operating condition.

48. The apparatus of claim 47 wherein said laser control signal is operator perceivable.

49. The apparatus according to claim 47 wherein said laser control signal is operatively associated with said laser for deactivating said laser from directing the beam of coherent energy.

50. The apparatus of claim 34 wherein said respective monitor signal is a fluorescence signal.

51. The apparatus of claim 50 wherein said fluorescence signal is operatively associated with said fluorescence for adjusting said fluorescence signal to be within said predetermined range of said respective preset value.

52. The apparatus according to 51 further comprising a flashlamp and said fluorescence signal is adjustable by adjusting one of current and voltage supplied to said flashlamp.

53. The apparatus according to claim 39, further comprising:
   a flashlamp having a flashlamp discharge timing;
   said laser beam having a laser energy;
   said respective preset value comprising a laser energy preset value;
   said respective monitor signal comprising a laser energy signal, said laser energy signal corresponding to said laser energy;
   said control signal operatively associated with said flashlamp;
   said flashlamp discharge timing adjustable to make said laser energy signal within said predetermined range of said laser energy preset value.

54. The apparatus according to claim 39, further comprising:
   a flashlamp;
   said laser beam having a laser energy;
   said respective preset value comprising a laser energy preset value;
   said respective monitor signal comprising a laser energy signal, said laser energy signal corresponding to said laser energy;
   said control signal operatively associated with said flashlamp whereby one of current and voltage supplied to said flashlamp is adjustable to make said laser energy signal within said predetermined range of said laser energy preset value.

* * * * *